April 10, 1934.    C. MORROW    1,954,218
PASTEURIZER
Filed July 21, 1932    7 Sheets-Sheet 1

INVENTOR.
Clifford Morrow
By
Geo. B. Pitts
ATTORNEY

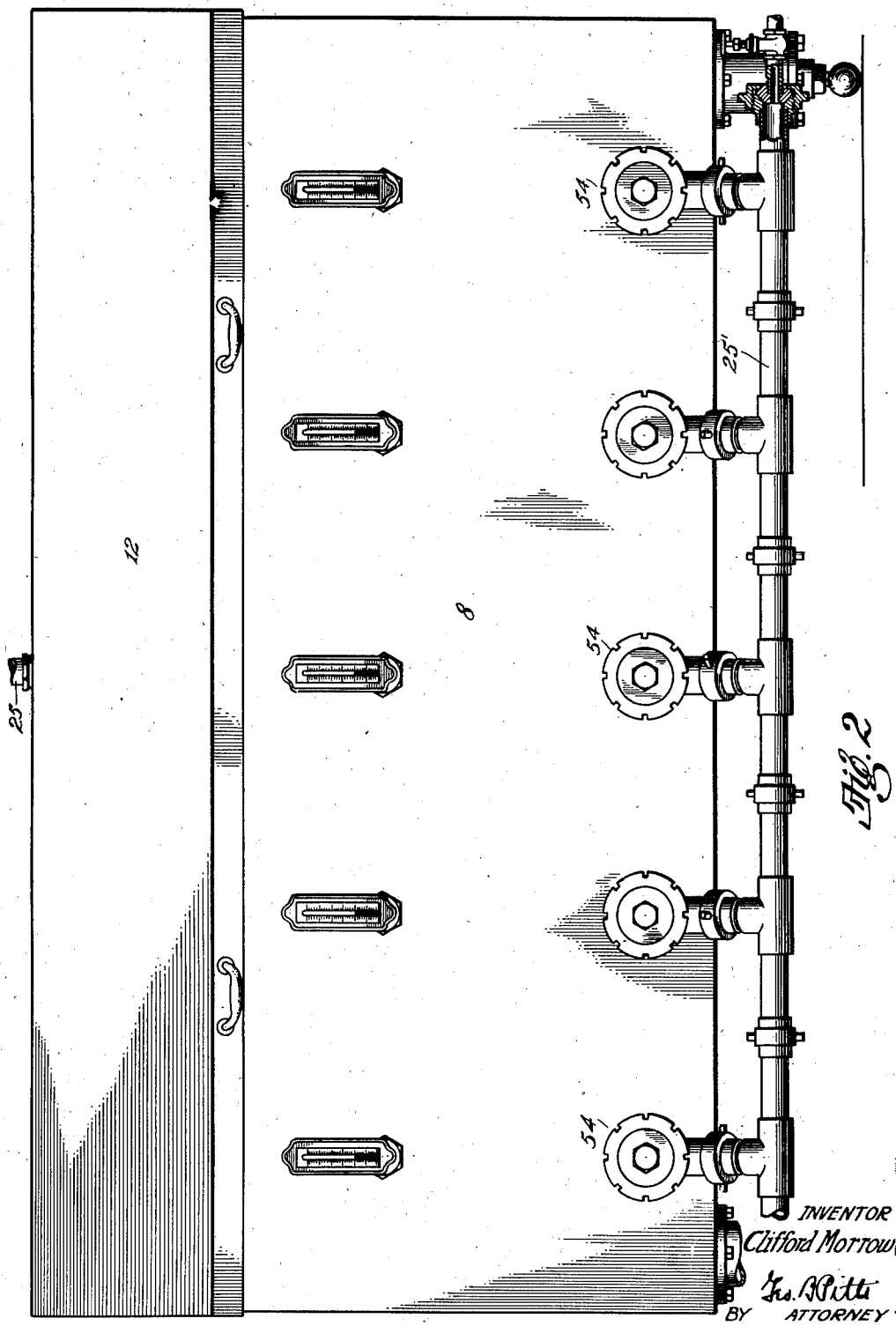

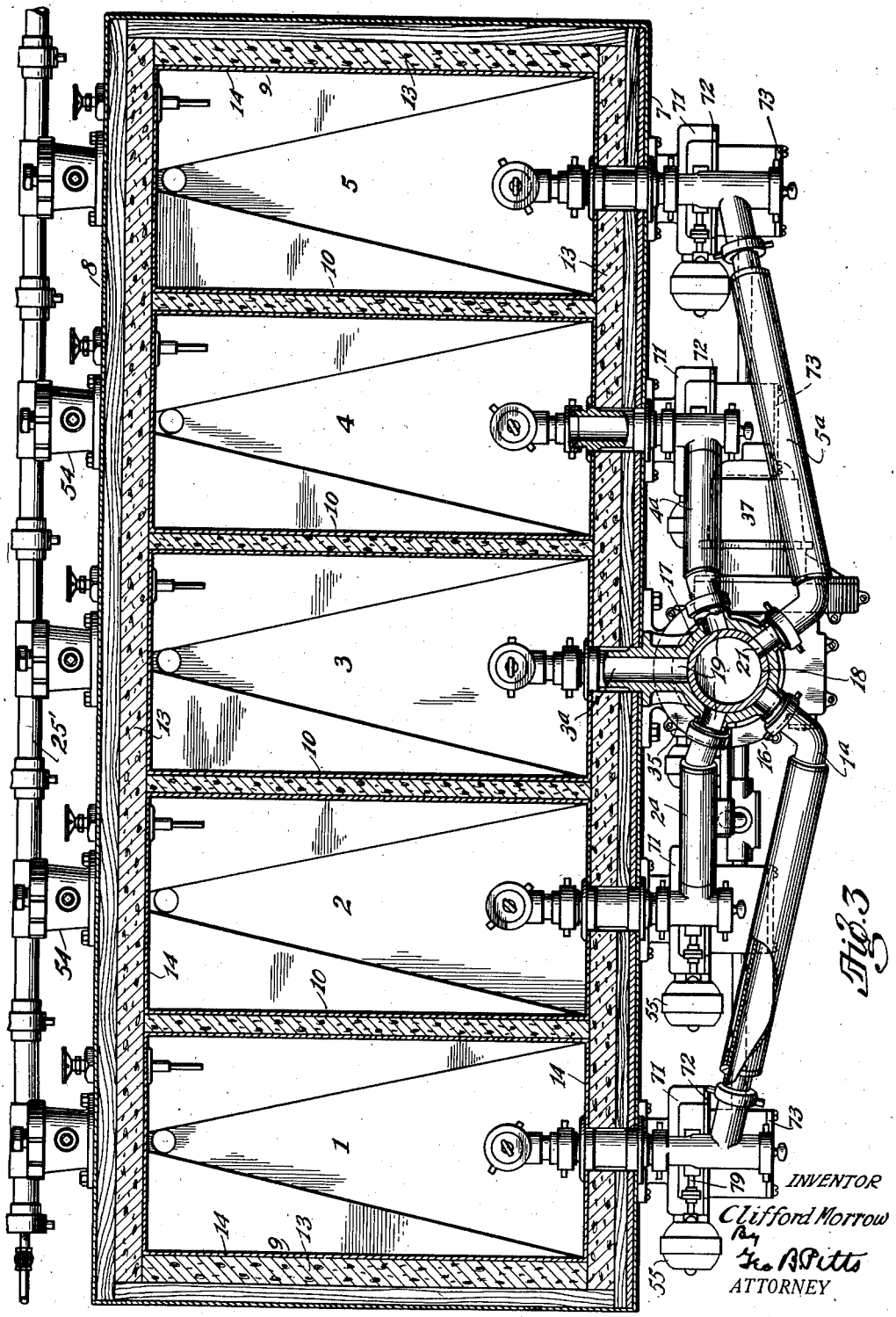

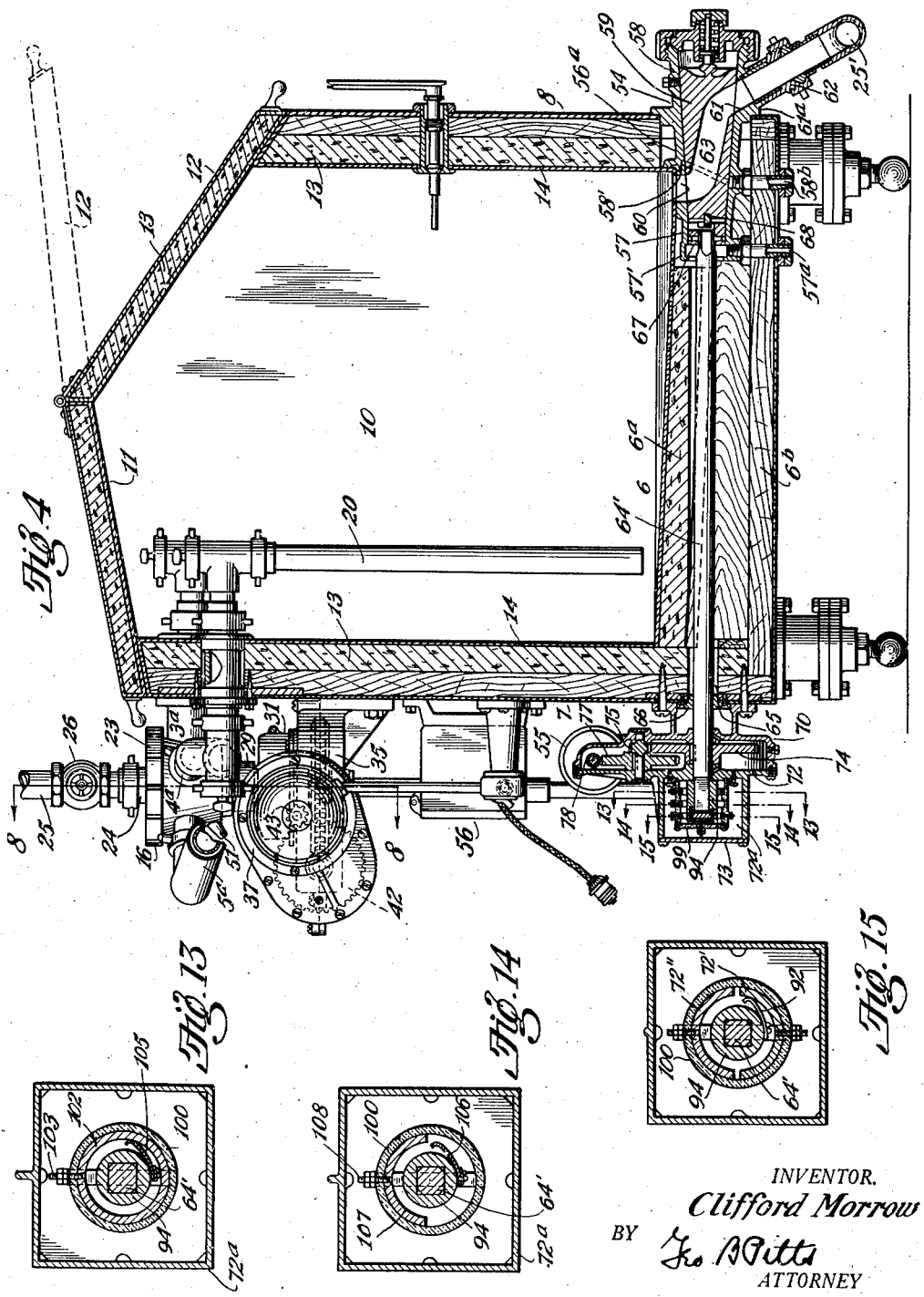

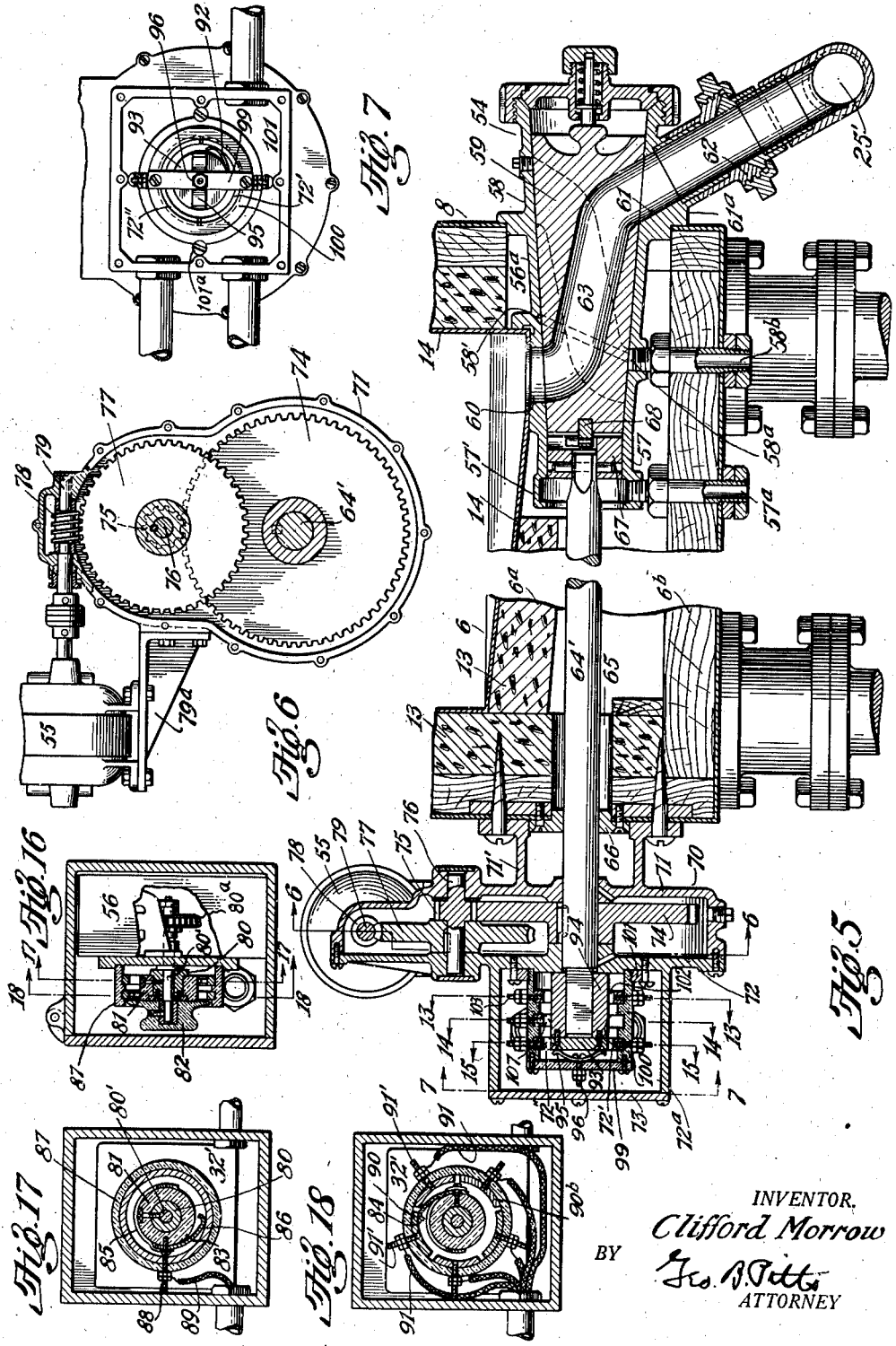

April 10, 1934.  C. MORROW  1,954,218
PASTEURIZER
Filed July 21, 1932  7 Sheets-Sheet 6
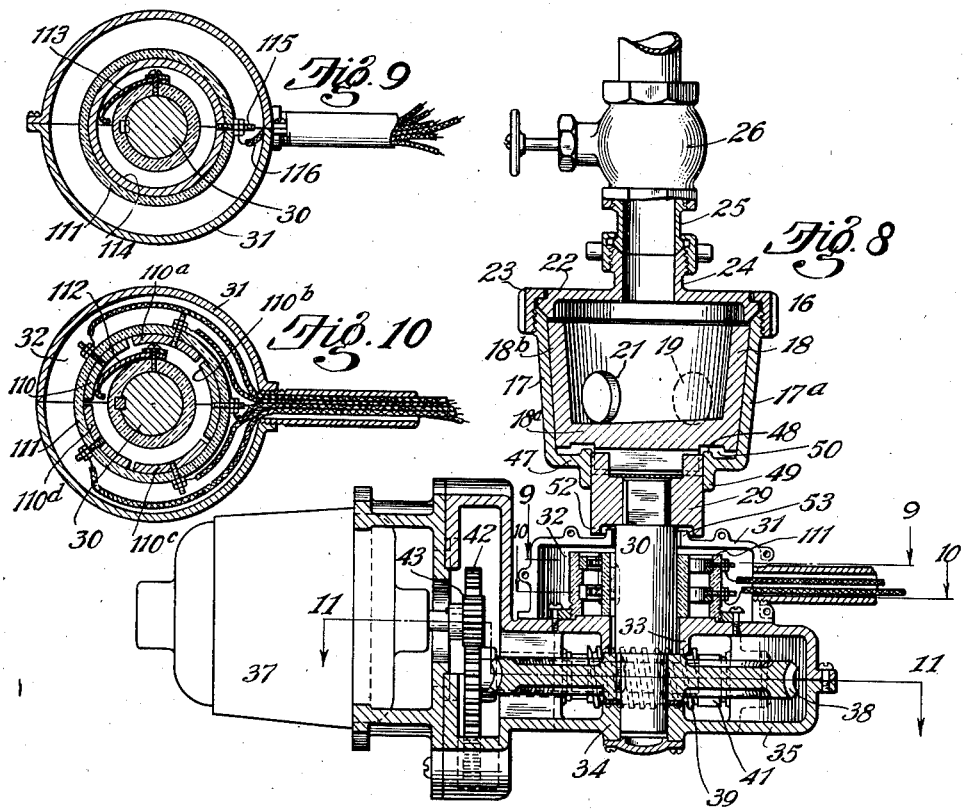
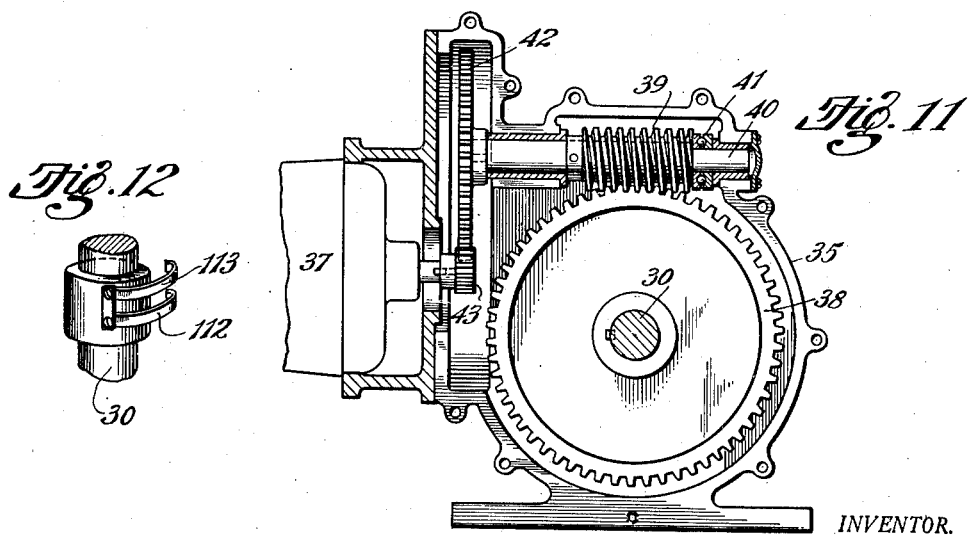
INVENTOR.
Clifford Morrow
BY
ATTORNEY

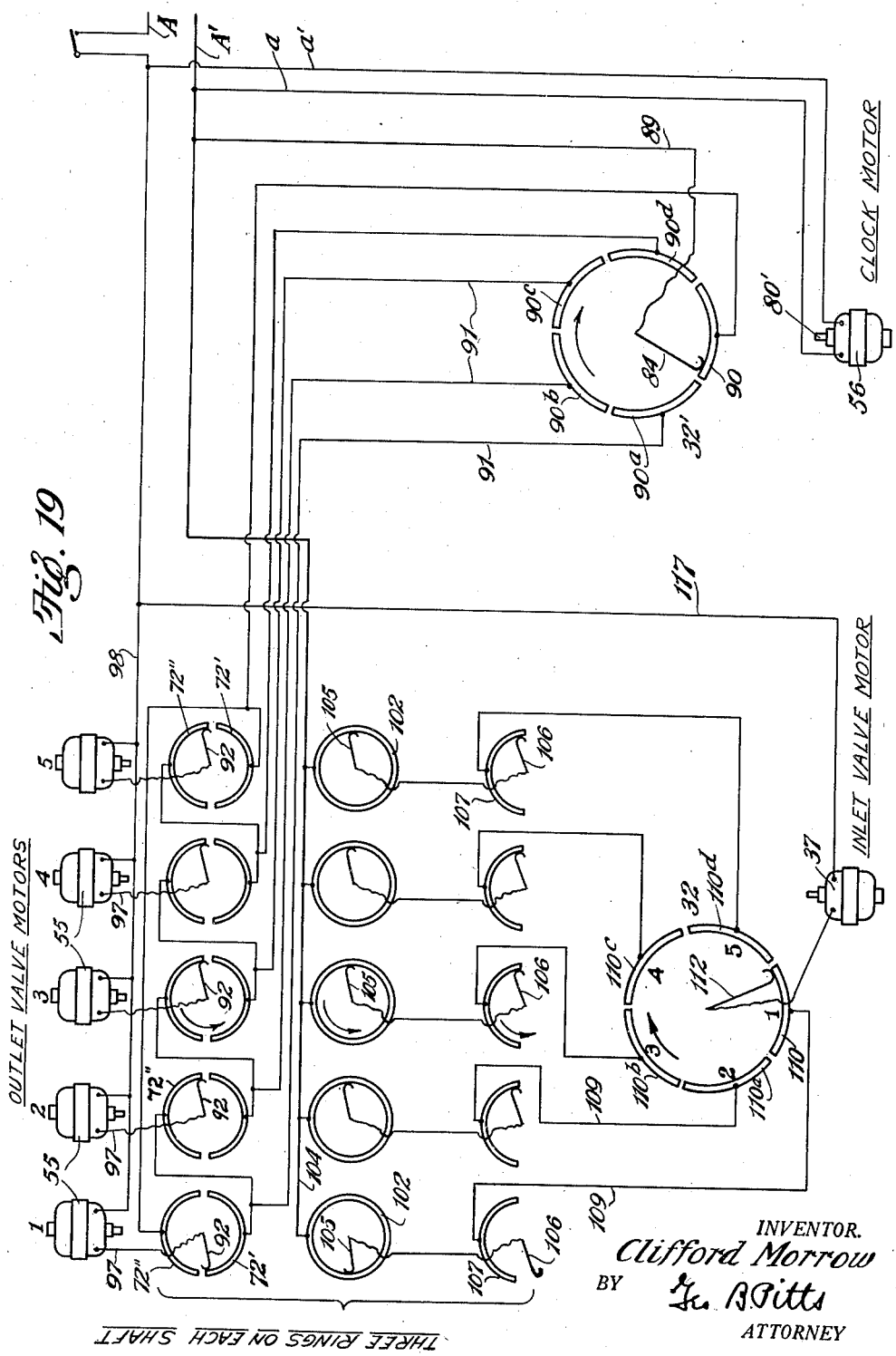

Patented Apr. 10, 1934

1,954,218

UNITED STATES PATENT OFFICE 1,954,218

PASTEURIZER

Clifford Morrow, Canton, Ohio, assignor to The
H. H. Miller Industries Company, Canton, Ohio,
a corporation of Ohio Application July 21, 1932, Serial No. 623,807

10 Claims. (Cl. 137—21)

This invention relates to the treatment of liquid, for example, the pasteurizing of milk, more particularly to apparatus having a plurality of compartments for holding portions of the milk and means for controlling its supply and discharge to and from the holding compartments.

One object of the invention is to provide an improved apparatus of this character in which the supply and discharge of milk to and from the holding compartments are controlled in a relatively quick and positive manner.

A further object is to simplify the construction of apparatus disclosed in my co-pending application Ser. No. 461,221, filed June 14, 1930.

Other objects of the invention will be apparent to those skilled in the art to which my invention relates from the following description taken in connection with the accompanying drawings, wherein Fig. 1 is a front elevation of an apparatus embodying my invention, parts being broken away.

Fig. 2 is a rear elevation.

Fig. 3 is a section on the line 3—3 of Fig. 1.

Fig. 4 is a section on the line 4—4 of Fig. 1.

Fig. 5 is a fragmentary section illustrating parts shown in Fig. 4, but somewhat enlarged.

Fig. 6 is a section on the line 6—6 of Fig. 5.

Fig. 7 is a section on the line 7—7 of Fig. 5.

Fig. 8 is a section on the line 8—8 of Fig. 4, somewhat enlarged.

Figure 1:
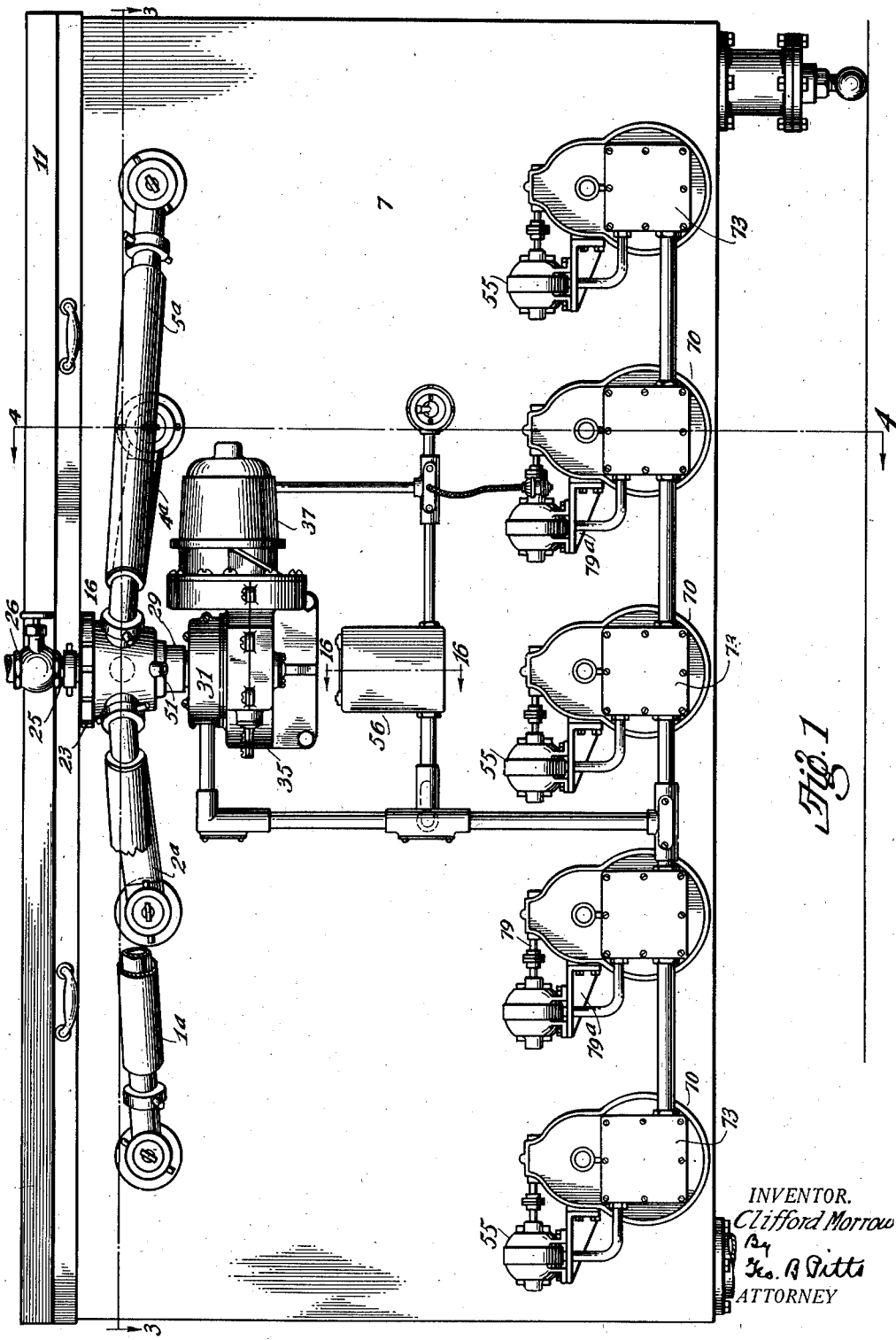

Figs. 9, 10 and 11 are sections on the lines 9—9, 10—10 and 11—11 of Fig. 8, respectively.

Fig. 12 is a fragmentary perspective view.

Figs. 13, 14 and 15 are sections on the lines 13—13, 14—14 and 15—15, respectively, of Figs. 4 and 5.

Fig. 16 is a section substantially on the line 16—16 of Fig. 1.

Figs. 17 and 18 are sections on the lines 17—17 and 18—18, respectively, of Fig. 16.

Fig. 19 is a diagram of the electrical circuits.

The apparatus herein disclosed is adapted to continuously receive milk, which has been previously heated to the desired temperature, for example 142° F., to hold it in its heated condition for a predetermined period to destroy certain bacteria and to then discharge the milk for conduction to a cooler. The heater and cooler (which are not shown) may be of any desired construction. The holder for the milk comprises a plurality of compartments 1, 2, 3, 4 and 5 for receiving and holding the heated milk, the supply of the milk to and its discharge from each compartment being controlled so that the milk therein is held for a predetermined period of time, preferably for approximately 30 minutes at the desired temperature, for example, approximately 142° F., as is customary in apparatus of this character. The compartments may be constructed and mounted separately as shown in Letters Patent No. 1,076,604 granted to Leroy S. Pfouts, or in a unitary, circular series as shown in Letters Patent No. 1,300,869 granted to George B. Pitts, but preferably they are arranged in side by side relation and incorporated into a single, unitary structure having a bottom 6, front and rear walls 7, 8, respectively, end walls 9 and intermediate partitions 10, which in cooperation with the remaining walls form the compartments or holders 1, 2, 3, 4 and 5. In this preferred arrangement, the milk is supplied to each compartment by a conduit, to which reference will later be made. Furthermore, the number of compartments may be increased or decreased, as desired, and the same may be filled and emptied in any desired sequence.

11 indicates a top wall extending between the end walls 9 and forming a support to which is hinged a cover 12. The wall 11 and cover 12 close the compartments when the latter is lowered as shown in Figs. 2 and 4. As shown, each of the walls, including the top wall 11 and cover 12, embody suitable heat insulating material, shown at 13, to prevent cooling of the heated milk while it is being held in each compartment. The construction of these walls to insure heat insulation may be of any desired form, also the bottom 6 comprises upper and lower walls 6a, 6b, for a purpose which will later appear. The interior of each compartment is suitably lined, as shown at 14, to insure durability and to prevent leakage, and the bottom of each compartment is inclined from the outlet (which is preferably arranged near the rear wall 8) upwardly to the front wall and to the adjacent partitions 10 to insure drainage when the compartment is emptying.

16 indicates as an entirety a valve mechanism for controlling the supply of milk to the compartments 1, 2, 3, 4 and 5 in the desired sequence, such supply being continuous so long as heated milk flows from the heater and the valve mechanism operates. The supply valve mechanism comprises a seat member 17 and a valve member 18 rotatably fitted within the seat member 17. The seat member is formed in its side wall 17a with discharge ports 19 (one for each compartment) connected by conduits 1a, 2a, 3a, 4a and 5a, respectively, with the compartments 1, 2, 3, 4, 5, these conduits leading through the side walls 7 near the tops of the compartments and connected to down pipes 20 (Fig. 4), which discharge the liquid near the bottoms 6 to prevent foaming. The valve seat member 17 is preferably of conical shape and the valve element is similarly shaped and provided with a bottom 18a to form a receiving chamber for the milk. The side wall 18b of the valve member is formed with a discharge port 21 adapted to register with the ports 19 successively, as the valve member rotates. The side wall 17a of the seat member 17 extends above the valve member 18 and is shaped to receive a plate 22, which is secured to the side wall 17a by a union 23, the plate forming a closure for the chamber within the valve member. The plate is sealed on the upper edge of the side wall 17a, by means of ground surfaces between such edge and the plate (see Fig. 8) to prevent leakage of the milk. The plate 22 is provided with a nipple or pipe end 24 to which is detachably connected a supply pipe 25 for the heated milk leading from the heater, this pipe being provided with a cut-off 26. The milk is continuously supplied by the pipe 25 and from the latter the milk, under control of the valve mechanism 16, flows to the compartments successively and is discharged therefrom successively, as will later appear, into a discharge pipe 25' which conveys the milk to a cooler (not shown), so that the milk flow from the heater to the holding apparatus and from the latter to the cooler is continuous and may be continued for an indefinite period of time. The side walls 17a, 18b, are preferably of conical shape to permit ready removal of the valve member 18 and to prevent leakage due to wear.

The bottom of the valve member 18 is detachably interlocked to a device 29 which is also detachably interlocked to the upper end of a driven shaft 30. The shaft 30 extends through a housing 31 for a switch mechanism 32 for the inlet valve 16 and is mounted in bearings 33, 34, provided on the upper and lower walls of a gear casing 35. The shaft 30 is driven at the desired speed through a driving means, which includes a suitable reduction gearing by an electric motor 37, as follows: the motor shaft 30 is provided with a worm gear 38 which meshes with a worm 39 fixed to a shaft 40. The shaft 40 is mounted in suitable bearings provided in the casing 35 and is also provided with a thrust bearing 41. The shaft 40 is provided with a gear 42, which meshes with a pinion 43, the latter being fixed to the shaft of the motor 37.

Means are provided for preventing leakage of the milk into the control switch casing 31, as well as into the gear casing 35, and permitting the escape of any milk that may leak past the valve member 18. As shown in Fig. 8, the seat member 17 has an inturned flange 47 having an upstanding collar 48 and a depending collar 49. The upstanding collar 48 forms a collecting channel 50 for milk if any leaks past the valve member 18 and this milk may escape through a discharge pipe 51 (see Fig. 1). The coupling device 29 removably fits the upper end of the shaft 30, the inner wall of said device and shaft having complementary portions. The upper end of the coupling device 29 rotatably fits the depending collar 49, while its lower end is provided with a skirt 52 which surrounds a flange or annular rib 53 around the opening in the casing 31 for the shaft 30. By constructing the coupling device 29 to fit over and enclose the upper end of the shaft 30 and providing its lower end and wall of the casing 31 with co-operating elements, danger of any milk finding its way through the shaft opening is entirely eliminated.

Each of the compartments 1, 2, 3, 4, 5, is provided with a discharge valve 54, which is opened and closed by an electric motor 55, the several valves being successively opened and successively closed, each valve being opened to permit discharge of the adjacent compartment and then closed in advance of the filling or supply of the milk thereto; as will later appear. The motors 55 are started and stopped in sequence by a main switch mechanism 32', preferably of the rotary type, the shaft of such mechanism being operated by an electric device for example, an electric timed motor, such as an electric clock 56, supplied with current from the mains A, A', through leads a, a', respectively, whereby the motor circuits will be closed and opened at predetermined timed intervals, as hereinafter set forth.

Each valve 54 comprises a hollow casting or member having a body portion 56a and inner and outer portions 57, 58, the inner walls of the member being of conical shape to form a seat for a rotary conical valve element 59. The inner portion 57 extends between the bottom wall 6b and lining 14 (the wall 6a being cut-away for this purpose) and is formed with an inlet opening 60 in registry with an opening formed in the lining. The portion 57 and the body portion are incorporated in the wall 6 and rear wall 8 and the inner portion around the opening 60 is secured to the lining 14 in a permanent, liquid tight manner. The outer portion 58 is formed on its lower side with an opening 61 surrounded by a tubular projection 61a to which is sweated or otherwise secured a pipe section 62 adapted to be detachably connected to the adjacent discharge pipe 25'. The valve element 59 is formed with a passage 63 extending diametrically from one side to the other, but at an inclination to the axis of the element, so that when the valve element is in the position shown in Figs. 4 and 5 (open), the inner end of the passage 63 registers with the opening 60 and the outer end of the passage 63 registers with the opening 61, whereby the milk in the adjacent compartment may flow therefrom. The valve element 59 is held to its seat, preferably in a yielding manner, the means herein disclosed being similar to that disclosed in my aforesaid application. 64' indicates shafts for rotating the valve elements 59, there being one shaft between each motor 55 and one of the valve elements. Each shaft 64' extends through the space between the walls 6a, 6b, an opening 65 formed in the wall 7 and a collar 66 fixed to the latter. The inner end of each shaft 64' carries a collar 67 rotatably fitting the inner end portion 57 of the valve casing, and the collar 67 in turn is provided with a clutch element 68 (of non-circular shape) fitting a correspondingly shaped recess formed in the inner end of the valve element 59.

The inner end portion 57 has an annular expanded portion 57' to form a channel into which milk, that escapes inwardly past the valve element 59, collects. The portion 57' has an outlet opening connected to a drain pipe 57a; the inner wall of the valve casing is provided with a groove 58' arranged to collect milk leaking outwardly. The groove 58' communicates with an opening 58a formed in the lower portion of the valve casing, this opening having a drain pipe 58b. It will be noted that the opening 58b is diametrically opposite the opening 60, so that when the valve element is in closed position, the inlet port of its duct 63 registers with the opening 58a (see dotted lines in Fig. 5) to permit the escape of excess milk adhering to the walls of the duct after the valve is closed.

70 indicates casings for (a) a driving means between each motor 55 and the adjacent shaft 64' and (b) a secondary switch mechanism which breaks the circuit for the adjacent motor and closes the circuit for the switch mechanism 32. The casing for the driving means consists of a main section 71 having a lateral annular web 71' secured to the wall 7 and a cover section 72 removably connected to the section 71; whereas the casing for the secondary switch mechanism consists of lateral side walls 72a provided (preferably integrally) on the cover section 72 and a plate 73 removably fixed to the walls 72a (Fig. 5). The shaft 64' extends through the sections 71, 72. 74 indicates a gear fixed to the shaft 64' between the sections 71, 72, and meshing with a pinion 75. The pinion 75 is fixed to a shaft 76 mounted in the sections 71, 72, and carrying a worm gear 77. The gear 77 meshes with a worm 78 which is fixed to a shaft 79, the latter being mounted in the walls of the section 71 and suitably coupled to the shaft of the adjacent motor 55. The motor 55 is preferably mounted on a bracket 79a, fixed to the adjacent casing section 71 (Fig. 6).

The main switch mechanism 32' comprises the following elements: 80 indicates a hub fixed to the shaft 80', which is driven through a reduction gearing 80a (Fig. 16) by the shaft of the timed motor 56. The reduction gearing 80a is arranged to drive the shaft 80' at the rate of one revolution in 51 minutes. The hub 80 carries an annulus 81 formed of insulating material, a cap 82 being secured to the outer end of the shaft and maintaining the hub and annulus in position. 83, 84, indicate wipers suitably fixed to the annulus 81 and connected (electrically) by a conducting strip 85. The wiper 83 rides on a continuous conductor ring 86, which is suitably secured to an annular wall 87 formed of insulating material and mounted on the front wall of the housing which encloses the motor 56. The ring 86 is connected by a terminal 88 to a lead 89 (Fig. 17). The wiper 84 rides on a series of segments 90, 90a, 90b, 90c, 90d (suitably insulated from each other)—see Figs. 18 and 19—each connected by a lead 91 through terminals 91' to a semicircular conducting ring 72' disposed concentrically to one of the shafts 64' and to the opposite semi-circular conducting ring 72'' similarly related to the adjoining shaft 64'. The purpose of the rings 72', 72'', will later appear.

From the foregoing description it will be seen that the shaft 80' rotates the wipers 83, 84, to complete the circuit through the lead 89, terminal 88, ring 86, wiper 83, conducting plate 85, wiper 84 and segments 90, 90a, 90b, 90c, 90d, successively, the engagement of the wiper 84 with each of these segments serving to close the circuits to two adjacent motors 55, which being thereby set in operation closes the valve 59 for one compartment to permit filling thereof and opens the valve 59 of the next compartment to permit emptying thereof. The segments 90, 90a, 90b, 90c and 90d are of such length that the wiper 84 is in contact with each thereof 10 minutes and twelve seconds, the twelve seconds being allowed for each valve 59 to rotate 180 degrees from closed to open position. The wiper 84 preferably bears yieldingly against the segments so that it may snap from one to the other to prevent arcing.

The circuit for each motor 55 is completed as follows: 92 indicates a wiper fixed to a conducting plate 93, which in turn is secured to a sleeve 94 formed of insulating material, the sleeve being fixed in any desired manner to the outer end of the adjacent shaft 64', whereby the wiper 92 is revolved and rides the conducting ring segments 72', 72'', successively (Fig. 15). The plate 93 is engaged by a resilient conducting member 95, connected by a terminal 96 to a lead 97, which in turn is connected to one side of the adjacent motor 55; the other side of the motor 55 being connected by a return lead 98 (common to all of the motors 55) to the supply main A.

The conducting member 95 is secured to a cover plate 99 by the terminal 96. The plate 99 is secured by screws to an annular wall 100, which is mounted in the casing 72a and surrounds the outer end of the shaft 64'. The inner end of the wall 100 is preferably threaded (and therefore removable) into an annulus 101 which is adjustably secured to the casing member 72 by screws 101a. The wall 100 forms a support for the conducting segments 72', 72'', and other parts to be later referred to. By loosening screws 101a, each wall 100 may be rotated to effect its adjustment. This adjustment serves to correlate the adjacent segments 72', 72'', to the adjacent valve element 59, so that the circuit for the adjacent motor 55 which rotates the shaft will be closed or opened to control the stopping of the valve in either its open or closed position.

The inlet valve mechanism 32 is controlled by the rotation of the shafts for the respective valves 59, so that the supply of milk to each compartment is dependent upon the closing of the valve therefor; that is, the rotation of each valve shaft to valve closing position controls the circuit for the inlet valve operating motor 37, so that each time the circuit is closed the inlet valve member 18 is rotated a predetermined distance (from one inlet port 19 to the next inlet port 19) and stopped, so that its discharge port 21 registers with the inlet ports 19, leading to the holding compartments, successively.

To carry out this operation, I provide the following instrumentalities: 102 indicates a conducting ring mounted internally on each wall 100 and connected by a terminal 103 to a lead 104 (which is common to all of the rings 102); the lead 104 being connected to the supply main A'. 105 indicates a wiper connected to the sleeve 94 and revolved thereby in engagement with the ring 102. 106 indicates a wiper also fixed to the sleeve 94 and having electrical connection with the wiper 105. The wiper 106 is arranged to engage a semi-circular conducting segment 107 also mounted internally on the wall 100 and connected by a terminal 108 to a lead 109. As shown in Figs. 10 and 19, the leads 109 connect the segments 107 to conducting segments 110, 110a, 110b, 110c, 110d, respectively, of the switch mechanism 32, which segments are mounted internally on a wall 111 supported within the casing 31. 112 indicates a wiper arranged to engage with the segments 110, 110a, 110b, 110c, 110d, successively. The wiper 112 is fixed to the shaft 30 (see Fig. 12) and rotated thereby and also electrically connected to a wiper 113 also fixed to and rotated by the shaft 30. The wiper 113 engages a conducting ring 114, mounted on the wall 111, which ring is connected through a terminal 115 to a lead 116, which in turn is connected to one side of the motor 37; the other side of the motor being connected by a lead 117 to the other supply main A.

Operation: referring to Fig. 19, the wipers 84, 92, 106, 112, are shown in the positions they occupy when the valve for compartment 1 is open and the valves for the remaining compartments are closed, it being assumed that the compartments 2, 3 and 4 are filled and filling of compartment 5 is being completed, and that the wiper 84 is being revolved by its shaft 80'. In this position the circuit to the motor 37 (through wiper 106, conductor 107, lead 109) is open. Upon the engagement of the wiper 84 with segment 90a, the circuits to the motors 55 for compartments 1 and 2 will be closed; these motors will close the valve for compartment 1 and open the valve for compartment 2 allowing the latter to empty, the circuit for the first motor being broken by the wiper 92 disengaging segment 72' and the circuit for the second motor being broken by the adjacent wiper disengaging segment 72'', so that the valves 59 operated by the motors make a half revolution and stop in the registering positions already referred to. The operation of these two motors 55 will also revolve the adjacent wipers 106a one-half revolution, causing the wiper 106 fixed to the valve operating shaft for compartment 1 to engage the adjacent segment 107 and the wiper 106 fixed to the valve operating shaft for compartment 2 to disengage the adjacent segment 107. This operation will close the circuit through segment 110 to the motor 37, which will operate the inlet valve 18 to effect registry between its port 21 and the port 19 for the inlet pipe 1a. As wiper 112 is operated by the motor 37 and the circuit through segment 110a has been opened, as above set forth, the riding of the wiper 112 from segment 110 will open the circuit to the motor 37 and stop it. Upon the wiper 84 engaging segment 90b, motors 55 for compartments 2 and 3 will operate the valves therefor, close the former and open the latter and control the circuit for the motor 37 to move the inlet valve 18 to the position for filling compartment 2. These operations for the discharge valves for adjoining compartments and the filling valve will be repeated as the wiper 84 successively engages the segments associated therewith. It will thus be seen that the discharge valves and inlet valve are so controlled with respect to each other that each compartment is successively emptied and filled in each revolution of the wiper. As it takes 10 minutes to fill each compartment and an equal time is allowed to emptying, the milk is held 30 minutes in each compartment between its filling and emptying. It will also be noted that the circuit for the motor 37 which operates the inlet valve is controlled by the shafts driven by the motors 55, so that the inlet valve motor is dependent upon the operation of the motors or the shafts driven thereby. As these shafts are connected to the discharge valves, the inlet valve motor can only be operated and the inlet valve moved to filling position for each compartment upon the closing of the valve for the corresponding compartment. It will further be noted that in this arrangement, the entire cycle of operations is controlled by a main switch mechanism and that the latter is operated by a relatively simple, economical power mechanism.

It will also be seen that while the wiper 84 remains in contact with each of the segments 90, 90a, 90b, 90c and 90d for a period of ten minutes and twelve seconds, to effect closing of the valve for one compartment and opening of the valve for the next compartment in the predetermined sequence, each motor 55 is stopped automatically when the valve rotated thereby makes a half revolution. This is accomplished by means of the wipers 92 and the substantially semi-circular segments 72', 72'', as each wiper disengages one or the other thereof. These segments therefore serve as separate or individual switches to stop the motors prior to the disengagement of the wiper 84 from the respective segments 90, 90a, 90b, 90c and 90d.

To those skilled in the art of the class described, many alterations in construction and widely differing embodiments and applications of my invention will suggest themselves, without departing from the spirit and scope thereof. My disclosures and the description herein are purely illustrative and are not intended to be in any sense limiting.

What I claim is:

1. In an apparatus of the class described, the combination of a series of compartments, a liquid supply, an inlet valve mechanism common thereto including a rotary element for controlling the flow of liquid to said compartments successively in a predetermined sequence, an electric motor for operating said element, circuits for said motor, a separate discharge valve for each compartment, an electric motor for operating each discharge valve, a circuit for each of the last mentioned motors, a switch mechanism for closing and opening the last mentioned circuits successively in a predetermined sequence, and switches controlled in relation to the movement of said discharge valves, respectively for closing and opening the first mentioned circuits.

2. In apparatus of the class described, the combination of a plurality of holding compartments for a liquid, a discharge valve for each compartment, an electric motor for operating each valve, a circuit for each motor, a switch mechanism for closing and opening said circuits successively to open said valves and close them in a predetermined sequence, an inlet valve mechanism for filling said compartments in the predetermined sequence, an electric motor for operating said mechanism, circuits for the last mentioned motor, and switches for the last mentioned circuits controlled in relation to the operation of said discharge valves, respectively.

3. In apparatus of the class described, the combination of a plurality of holding compartments for a liquid, a rotary discharge valve for each compartment, a motor drivingly connected to the shank for each said valve, circuits for said motors, a switch mechanism for closing said circuits successively, means controlled by each valve shank for stopping its operating motor when the valve has rotated a predetermined distance, an inlet valve mechanism for supplying liquid to said compartments, an electric motor for operating said mechanism, a circuit for the last mentioned motor, and means for automatically controlling the closing and opening of the last mentioned circuit in relation to the successive operation of said discharge valves.

4. In apparatus of the class described, the combination of a plurality of holding compartments for a liquid, a rotary discharge valve for each compartment, a motor drivingly connected to the shank for each said valve, circuits for said motors, a switch mechanism for closing said circuits successively, means controlled by each valve shank for stopping its operating motor when the valve has rotated a predetermined distance, an inlet valve mechanism for supplying liquid to said compartments, an electric motor for operating said mechanism, a circuit for the last mentioned motor, and means for automatically controlling the closing and opening of the last mentioned circuit in relation to the successive operation of said discharge valves, said means including switches the movable elements of which are operated by the shanks for said discharge valves.

5. In apparatus of the class described, the combination of a plurality of holding compartments for a liquid, a rotary discharge valve for each compartment, a motor drivingly connected to the shank for each valve, circuits for said motors, connected thereto to operate two thereof simultaneously, whereby the valve for one compartment is opened and the valve for the next compartment in the sequence of operation is closed, a switch mechanism for progressively controlling said motor circuits, an inlet valve mechanism for supplying liquid to said compartments successively, an electric motor for operating said mechanism, circuits for said motor, a switch mechanism in the last mentioned circuits actuated by said motor, and a switch in each of the last mentioned circuits actuated by the shanks for said discharge valves, said switches being so arranged that when any two of said valves are operating, one switch closes one circuit to set the last mentioned motor in operation and the other switch opens another circuit to said motor to control the movement of said inlet valve mechanism a predetermined distance at each operation thereof.

6. In apparatus of the class described, the combination of a plurality of holding compartments for a liquid, an inlet valve mechanism for supplying liquid to said compartments successively, a discharge valve for each compartment, an electric motor for operating each said valve, a circuit for each motor, a switch mechanism for closing said circuits in a predetermined sequence, an electric motor for operating said valve mechanism, and circuits for the last mentioned motor automatically controlled in relation to the operation of said discharge valves.

7. In apparatus of the class described, the combination of a plurality of holding compartments for a liquid, a discharge valve for each compartment, electrically operated power means for successively opening said valves in a predetermined sequence and for simultaneously successively closing said valves in a predetermined sequence in progressive relation, an inlet valve meehanism for supplying liquid to said compartments successively, and separate means automatically controlled in relation to the discharge valves, respectively, for effecting operation of said inlet valve mechanism.

8. In apparatus of the class described, the combination of a plurality of holding compartments for a liquid, a discharge valve for each compartment, electrically operated power means for successively opening said valves in a predetermined sequence and for simultaneously successively closing said valves in a predetermined sequence in progressive relation, an inlet valve mechanism for supplying liquid to said compartments successively, and separate means controlled by the shanks of said discharge valves which at any time are being operated by said power means for starting said inlet valve mechanism and stopping it at predetermined filling positions.

9. In apparatus of the class described, the combination of a plurality of holding compartments for a liquid, a switch mechanism, a rotary discharge valve for each compartment, an electric motor drivingly connected to the shank for each said valve, circuits for said motors arranged to simultaneously close the circuits to two of said motors in progressive relation in a predetermined sequence, upon the operation of said switch mechanism, said circuits including alternately operating switches controlled by the valve shanks, whereby the operation of each valve from one position to its other position opens one circuit for the adjacent motor and connects in the other circuit to the adjacent motor, an inlet valve mechanism, a power mechanism for operating said valve mechanism, and means actuated by the shanks of said discharge valves for controlling said power mechanism.

10. In apparatus of the class described, the combination of a plurality of holding compartments, an inlet valve mechanism for supplying liquid to said compartments successively, a discharge valve for each compartment, electric motors and driving connections between each thereof and one of the discharge valves for operating the latter, an electric motor for operating said inlet valve mechanism, circuits for said first mentioned motors, a switch mechanism for said circuits and means for operating said switch mechanism for controlling the operation of said discharge valves in a predetermined sequence, circuits for said last mentioned motor, and switches operated by the operating connections between said first mentioned motors and the discharge valves, respectively, for controlling the operation of said last mentioned electric motor.

CLIFFORD MORROW.